United States Patent [19]

Trobaugh

[11] 4,258,747

[45] Mar. 31, 1981

[54] FLOW SYSTEM WITH PRESSURE LEVEL INTERLOCK CONTROL APPARATUS

[75] Inventor: Arnold G. Trobaugh, Milwaukee, Wis.

[73] Assignee: Johnson Controls, Inc., Milwaukee, Wis.

[21] Appl. No.: 26,175

[22] Filed: Apr. 2, 1979

[51] Int. Cl.³ ............................................. F16K 31/36
[52] U.S. Cl. ..................................... 137/488; 137/403
[58] Field of Search ............. 137/488, 403, 492, 492.5

[56] References Cited

U.S. PATENT DOCUMENTS 3,777,778 12/1973 Janu .................................. 137/487.5

Primary Examiner—Alan Cohan
Attorney, Agent, or Firm—Andrus, Sceales, Starke & Sawall

[57] ABSTRACT

A vacuum operated sewage system includes a static pressure sensor establishing a trigger signal at a selected first level in a standpipe. The sensor is connected upstream of a discharge control valve and actuates a trigger and timer controller at the selected sensed pressure to establish low for a predetermined period. A suitable time delay capacitor in the controller prevents transient signal actuation. A system pressure interlock senses the vacuum level of the system to disable the timer controller if system pressure is below a selected level. The interlock may include a pressure level control valve connected to bleed the capacitor and disable the timer controller. A system pressure sensing valve in parallel with the level control valve decouples the latter as long as the system level is above the selected minimum and thereby permits normal controller operation.

11 Claims, 1 Drawing Figure

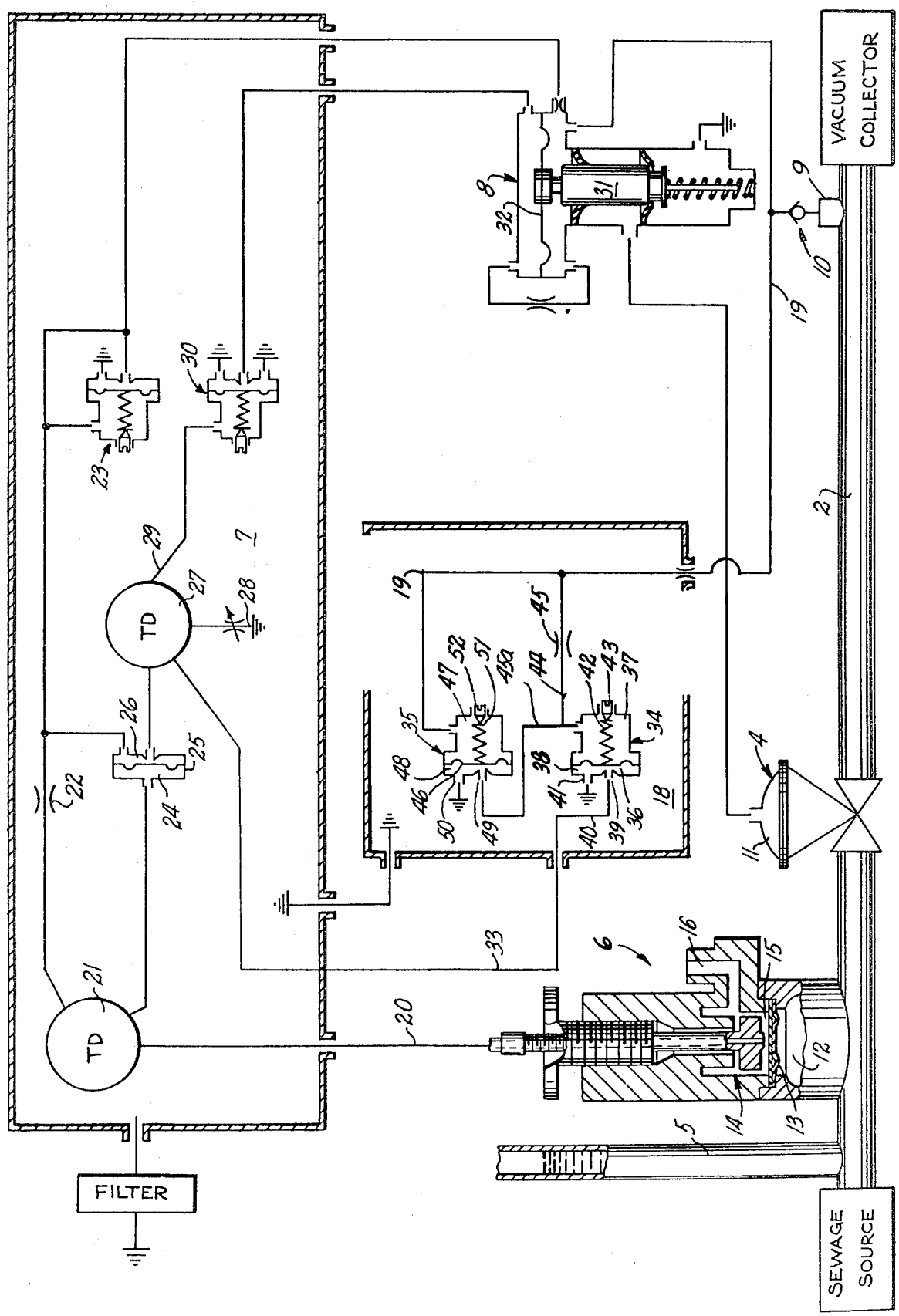

FLOW SYSTEM WITH PRESSURE LEVEL INTERLOCK CONTROL APPARATUS

BACKGROUND OF THE INVENTION

This invention relates to a pressure controller and particularly to such a controller for a vacuum operated flow system.

In flow systems, the pressure differential for establishing flow may include a downstream vacuum source. A temporary storage means such as a storage tank, a standpipe or the like within which liquid is stored until it reaches a selected level may be incorporated into the system. When such a selected level is reached, a discharge apparatus is actuated to remove liquid generally until a lower limit is established.

A particularly satisfactory two-position liquid level controller for a vacuum operated sewage disposal system and the like is disclosed in U.S. Pat. No. 3,777,778. The fluid sensor is mounted upstream of the discharge control valve and is connected to actuate a triggered controller having a fluid relay connected to charge a fluid timing capacitor which, in turn, actuates a fluid switch. The timing capacitor is preferably a storage device connected to atmospheric pressure through an adjustable resistor. When the output signal from the sensor is received, the vacuum connection to the capacitor is momentarily made and the vacuum established as a reference. The capacitor output signals the fluid switch which actuates a pilot valve to open the main valve. The sewerage flow continues until such time as the main capacitor has totally discharged, at which time the switch converts to an "off" condition, resetting the pilot valve and moving the main valve to a closed condition. The timing provides a constant volume of the liquid discharged per cycle independent of the input flow into the system. This is particularly significant in flow systems which rely on a slug or incremental liquid transfer in response to a given condition; such as a vacuum powered sewage transport system and the like.

In certain sewage disposal systems, a relatively high vacuum pressure, significantly higher than that employed in the conventional domestic distribution system, is required to remove the sewage from a storage tank or the like. For example, in a marina the sewage is pumped from boat holding tanks and the like into a large storage tank. At a selected volume or level of sewage the storage tank is emptied into a discharging system. In the transfer system, a vacuum level on the order of twelve to fourteen inches of mercury is generally employed. Although the vacuum sewage systems, such as shown in above identified patent and application, provide a highly satisfactory basic system for a marina and like high pressure system, it is important that pumping does not begin prior to creation of an appropriate vacuum system pressure. Further, the sewage system should operate automatically in the presence of proper pressure conditions.

SUMMARY OF THE INVENTION

The present invention is particularly directed to a sewage system or the like having a trigger and timer control means for activating of the removal system for a selected pumping period in response to a trigger signal related to the stored level in combination with an automatic pressure level control which produces operation of the system only with proper system pressure conditions. More particularly, in accordance with the present invention, a line pressure monitor is coupled to the system's trigger and timer control means and preferably to a pressure responsive valve means in such control means to condition the trigger and timer control means for operation only with proper system pressure conditions existing in the sewerage line. The monitor automatically and positively disable the trigger and timer control means during any period of an inoperative or ineffective system pressure condition.

More particularly, in accordance with an embodiment of the invention for a timer control means having a resettable time delay capacitor or storage means, and a pressure responsive bleed valve means is connected to the time delay capacitor and to a reference pressure level. The pressure responsive bleed valve means may include an adjustable set point means and a signal control input which is connected to system pressure. A by-pass and level sensing valve is connected in parallel with the bleed valve and also includes an input connected to the system pressure. The level sensing valve means controls the application of system pressure to the bleed valve. In one embodiment, the level sensing valve means provides a connection of the input of the disable or bleed valve to ground or reference pressure and with proper system pressure by-passes system pressure from the bleed valve which closes and operatively inserts the timing capacitor into the controller system and permits normal system operation. If the pressure should drop below the minimum desired vacuum level, the level sensing valve means closes, and system pressure is now applied to the disable or bleed valve means which opens and operatively removes the timing delay capacitor from the controller.

The paralleled control valve units have been found to provide a highly accurate and reliable means of automatically conditioning the system for operation during proper system pressure conditions, while holding the system inoperative during periods when system pressure is below an effective operating level. The valve units employed may be conventional and readily available components which are presently employed in such flow control systems. Those skilled in the art can therefore readily provide appropriate installation and maintenance.

BRIEF DESCRIPTION OF THE DRAWING

The drawing furnished herewith illustrates a preferred construction of the present invention in which the above advantages and features are clearly disclosed as well as others which will be readily understood from the description of such illustrated embodiment.

The drawing is a schematic circuit illustrating a vacuum operated sewage flow system incorporating a pressure sensor and controller apparatus constructed in accordance with the present invention.

DESCRIPTION OF ILLUSTRATED EMBODIMENT

Referring to the drawing, a sewage flow system, similar to that disclosed in U.S. Pat. No. 3,777,778, includes a vacuum collector 1 at a collection end of a flow line 2 coupled to a sewage source 3. A main discharge valve 4 is provided in the flow line 2 and is periodically actuated to provide for transfer of a predetermined amount of sewage to the collector. A standpipe 5 is connected to the upstream end of the flow line 2 and within which the sewage will accumulate. As the sewage accumulates, the hydrostatic pressure in the flow line 2 increases accordingly. A hydrostatic pressure sensor 6 connected to the flow line 2 responds to the hydrostatic pressure and at a selected pressure level actuates a pneumatic triggered timing controller 7 which, in turn, is connected to actuate a pilot valve 8. The main valve 4 is selectively opened and closed by the operation of pilot valve 8 connecting pressure to an operating valve chamber 11. The valves 4 and 8, sensor 6 and controller 7 are all pneumatic pressure responsive devices which are connected directly into the vacuum system via a connection tap 9 and a check valve 10 such that the controller system is driven from the main pressure means as a common power source.

Generally, the illustrated sensor 6 is a leakport unit having an inlet chamber 12 coupled to the line 2 to impress flow line pressure upon a diaphragm unit 13. An adjustable mounted orifice 14 is located in alignment with the central portion of the diaphragm 13 within an exhaust chamber 15 having a port 16. The port 16 is connected to atmosphere or reference pressure by a pressure level interlock means 18 particularly forming an embodiment of this invention, as more fully described hereinafter. The interlock means 18 monitors the vacuum pressure level in the line 2 downstream of valve 4, and particularly at connection 9 in the illustrated embodiment via a connecting sensing line 19. If the vacuum pressure in the flow line 2 drops below a selected pressure level, the interlock means 18 is actuated to disable the controller 7 and prevent the timed opening of the valve 4. The controller 7 is released whenever proper system is established.

Sensor 6 otherwise functions, as disclosed in the above patent, to actuate the controller 7 and open the main valve 4 when sewage has accumulated to a level for developing a slug of sewage for movement through the line 2.

The controller 7 and related valves 4 and 8 are therefore only briefly described herein in sufficient detail to clearly set forth the illustrated embodiment of the invention. Sensor 6 is a leakport unit having orifice 14 connected to control the exhaust of air from a back pressure signal line 20 from controller 7. Line 20 is connected to the flow line connection 9 via time delay capacitor or chamber 21, a restrictor 22 and a vacuum regulator 23 to develop a pressure signal to controller 7.

The input time delay capacitor or chamber 21 is connected to the input chamber 24 of a fluid comparator or relay 25. The relay 25 is a diaphragm unit defining a signal input chamber 24 and an output chamber 26 which connects the regulated pressure supply line from regulator 23 to a time delay capacitor or chamber 27, as more fully described in U.S. Pat. No. 3,777,778 to establish a full and free connection to the vacuum source.

The timing capacitor 27 has a second input including a time adjust restrictor 28 which connects the capacitor to atmosphere. The capacitor 27 is thus connected to vacuum via relay 25 or atmosphere via restrictor 28, and has an output 29 connected to actuate a diaphragm switch 30, which is similar to the regulator 23 in construction and such as shown in U.S. Pat. No. 3,777,778. Switch 30, in turn operates the pilot valve 8 to open and close main valve 4. Valve 8 is a diaphragm operated spool unit having a spring-loaded spool 31 affixed to a diaphragm 32 and positioned thereby within a valve housing. Diaphragm 32 is controlled by the signal from the switch 30, as now fully disclosed in the above cited U.S. Patent to supply a pressure signal to operate valve 4.

The interlock means 18 includes a disable or bleed valve 34 connected to the timing capacitor 27 via line 33, and level sensor valve 35 connected to control valve 34. Under normal operation, valve 34 is closed and capacitor 27 functions as described above to provide for the normal controller operation in response to accumulation of sewage in standpipe 5. The valve 35 automatically responds to a low pressure state to open the valve 34, and, thereby establish a fast bleed or discharge of capacitor 27 as long the vacuum is below the selected level, to prevent triggering of the controller 7.

In the illustrated embodiment of the invention, the interlock means 18 includes the first and second adjustable setpoint leakport valve units 34 and 35. Each of the valve units is similar to the pressure regulator valve 23 and switch 30, and are constructed as more fully disclosed in U.S. Pat. No. 3,662,779, and valve unit 34 is described in detail.

Referring to the valve unit 34, a diaphragm 36 defines a common wall between an input signal chamber 37 and an output or pressure control chamber 38. The output control chamber 38 includes an orifice 39 connected by a suitable line 40 to the timing capacitor 27 of the controller 7. The orifice 39 is opened and closed by the movement of the diaphragm 36. The output chamber 38 also includes a port 41 connected to reference pressure, shown by the conventional ground symbol, in the illustrated embodiment. With the orifice 39 open, the time delay unit 27 is coupled to ground which effectively prevents charging thereof and triggering of the controller 7. Thus, with the orifice 39 open, the controller unit 7 is effectively disabled. With the orifice 39 closed, the timing delay chamber 27 may be charged as previously described and controller 7 is operative to respond to the trigger signal in accordance with a conventional operation. The diaphragm 36 of valve 34 is biased to close the orifice by a coil spring 42 located within the signal input chamber 37. An adjustment nut 43 permits adjusting of the spring pressure and the closing force exerted by the coil spring 42. A signal line 44, which includes a limiting resistor or restrictor 45, connects the input chamber 37 to the system pressure line 19. The input chamber 37 is also connected via a line 45a to reference or ground through the system pressure level sensing valve unit 35. With below normal system pressure, the valve unit 35 closes the line 45a to ground as more fully developed hereinafter, the system pressure is applied through the dropping resistor or restrictor 45 to the input chamber 37. A vacuum pressure of a below and desired minimum operative level down to a rather low level holds the valve 34 open and effectively disables the control unit.

The valve unit 34 is preferably set to respond to a vacuum pressure slightly below the minimum signalling pressure level required for operation of the controller 7. If the vacuum should drop below the setting of the control valve 34, the valve 34, of course, closes and remains closed, effectively conditioning the controller 7 operation even though system pressure is substantially below the operating lead. However, the controller 7 is then not provided with the minimum signal level sufficient to actuate it and the system remains inoperative until the vacuum pressure increases. As the pressure in the system increases, it will first necessarily reach the level of the disable bleed valve 34, actuating it to disable the controller 7, as described above. This condition continues until such time as the system pressure rises to proper vacuum level for operating of the system. When the system pressure reaches proper operating level, the level sensing valve 35 is actuated to operatively reset the disable valve 34 and thereby permit normal controller operation, as follows.

The level sensing valve 35 is also a diaphragm unit similar to valve 34. Valve 35 also includes a diaphragm unit 46 defining a common wall between an input chamber 47 and an output chamber 48, with the input chamber 47 connected directly to the system pressure sensor line 19. Valve 35 includes an orifice 49 connected via line 45a to the input chamber 37 of the disable valve 35 and an output port 50 connected to ground. A setpoint spring 51 in the input chamber 47 of the valve 35 is set via an adjustment screw 52 to the minimum desired system pressure for operating of the removal system. For example, in a marina system, the pressure level sensing valve 35 would be set to a level generally on the order of twelve to fourteen inches of mercury, by appropriate setting of the adjustment screw 52. The diaphragm 46 is thus spring biased to hold the orifice 49 closed and to apply system pressure to the disable valve 34 and particularly its input chamber 37. When the system pressure vacuum rises to the twelve inches of mercury, the vacuum in the input chamber 47 and the reference pressure in the output chamber 48 increases the differential to a level to overcome the spring force of spring 51 and causes the diaphragm 46 to move from the orifice 49. This condition will remain as long as the system pressure is above the desired level. The result is to open the orifice 49, thereby opening of the line 45a from the input chamber 37 of the disable valve 34 to ground and holding the input chamber 37 effectively at ground or reference, and at least below the minimum setting of the disable valve 34. Thus the level sensor valve 35 effectively by-passes the system pressure from the input chamber 37 of the disable valve 34 to ground and the spring 42 closes the valve 34. Thus, as previously described, with the input chamber 37 effectively at ground or at least below 3 inches of mercury, the differential fluid pressure across the diaphragm is minimal and the spring 42 of disable valve 34 effectively closes that valve 34. With valve 34 closed, capacitor 27 is not directly grounded and the trigger and timer controller 7 is conditioned for normal operation.

Under that condition, the system provides the normal operation. When the level in the holding tank reaches a selected level, the back pressure signal rises to the triggering level, for example, three inches of mercury. The back pressure charges the time delay capacitor 21 and provides a trigger signal to the relay 24 which in turn actuates the time delay capacitor 27 and valve unit 30 to operate as summarized above and more fully described in U.S. Pat. No. 3,777,778 to actuate the pilot and main valves 4 and 8 in the normal manner. A timed transfer of sewage from the storage tanks is thereby created.

If system pressure drops below the 12 inches of mercury, the interlock means 18 is actuated with valve 35 reset and spring 51 closing the orifice 49, and again applying line pressure to valve 34. The vacuum in chamber 37 of valve 34 opens the valves and thereby disables the controller 7 and thus prevent inoperative functioning of the system. A suitable output indicating signal may also of course be provided when such a condition exists.

The present invention thus provides a simple, reliable means for controlling pneumatic and other fluid control system and the like and adapted to use readily understood and commercially available components.

Various modes in carrying out the invention are contemplated as being within the scope of the following claims, particularly pointing out and distinctly claiming the subject matter which is regarded as the invention.

I claim:

1. A flow control system having a pressure source means and a line valve means in a flow line to establish a pressurized flow through the line, said pressure source means being operable to establish a selected line pumping pressure level, comprising a controller for selectively operating said valve means to establish a flow cycle, said controller having means operating said valve means in response to an input signal generated independently of said pressure level and including a controllable switch means for actuating the controller, and interlock limit means to sense the pressure in the line with the valve closed and coupled to the switch means to prevent operation thereof and thereby actuation of the line valve means in response to a preselected line pressure less than said selected line pumping pressure level.

2. A flow control system having a pressure source means and a line valve means in a flow line to establish a pressurized flow through the line, said pressure source being operable to establish a selected line pumping pressure level, comprising a fluid controller for selectively operating said valve means to establish a flow cycle, said controller having a fluid operated actuator for operating said valve means and said actuator being responsive to a trigger input fluid signal of a first selected level and including a resettable time delay means requiring a trigger input signal of predetermined minimum period, and interlock control means to sense the downstream pressure in the line with the valve closed and coupled to the time delay means to prevent operation thereof and thereby actuation of the line valve means in response to preselected abnormal line pressure conditions less than said selected line pumping pressure level.

3. The flow control system of claim 2 wherein said time delay means includes a fluid capacitor means having a fluid discharge passageway and having a charging input coupled to said trigger input signal, and said control means including a disable valve means connecting said discharge passageway to a reference pressure means to prevent charging of said fluid capacitor means.

4. The flow system of claim 3 wherein said control means includes a pressure level sensor connected to said line, and having a pressure actuated means responsive to said sensor, said pressure actuated means being connected to selectively operate the disable valve means in accordance with the pressure in said line.

5. In the flow system of claim 3 wherein said control means includes a high pressure level sensing valve means having an input signal chamber connected to said line and having a valved passageway, said disable valve means having an input signal chamber connected to said line and having a valved passageway connected to said discharge passageway and operative to hold said capacitor means in a reset position, and means connecting the input chamber of the disable valve means and the valved passageway of the level sensing valve means to by-pass the pressure of the line from the disable valve in response to a preselected minimum pressure in said input signal chamber of said high pressure level sensing valve means.

6. The flow control system of claim 2 wherein said controller is fluid actuated and is coupled to system pressure for operation and requiring a first minimum pressure level for operating the controller, said flow line requiring a second minimum pressure level substantially greater than said first minimum pressure level to establish proper pressurized flow, and said control means includes first pressure responsive means responsive to system pressure below said first minimum pressure to condition said controller for operation and above said first minimum pressure to disable said controller, a second pressure responsive means connected to by-pass system pressure from said first pressure responsive means and responsive to system pressure below said second minimum pressure level to connect system pressure to said first pressure responsive means.

7. A gravity flow system having a vacuum source means and a line valve means upstream of said source means in a flow line to establish a pressurized flow through the line, said vacuum source means operable to establish a selected vacuum pumping level in said flow line, comprising a fluid responsive controller for selectively operating said valve means to establish a flow cycle, said controller connected to the line upstream of the vacuum source to derive operating fluid from said line and being responsive to a trigger input signal created by the pressure state upstream of said line valve means and including a resettable time delay capacitor means requiring a trigger input signal of a minimum period to operate said valve means, pressure sensing means connected to sense the vacuum level in the line downstream of the valve means, and interlock control means connected to said sensing means and coupled to the time delay capacitor means to prevent timing operation thereof and thereby actuating of the line valve means in response to a line vacuum level less than said selected vacuum pumping level.

8. The flow system of claim 7 wherein said control means includes a disable valve connecting said capacitor means to a reference pressure means to prevent charging of said capacitor means, a by-pass valve connected to disable the disable valve and there permit charging of said capacitor means, and said pressure sensing means being connected to operate said disable valve means and said by-pass valve means.

9. The flow system of claim 8 wherein said disable valve and said by-pass valves are spring-loaded pressure actuated valve means each having an input chamber connected to said sensing means, said by-pass valve being connected to selectively connect the input chamber of the disable valve to a reference pressure in accordance with the line pressure level.

10. In the flow system of claim 7 wherein said control means includes a high pressure level sensing by-pass valve means, said by-pass valve being a diaphragm operated valve having an input signal chamber connected to the pressure sensing means and having a valved passageway and a closure spring resiliently holding the passageway closed, a disable valve means, said disable valve being a diaphragm operated valve having an input signal chamber connected to said pressure sensing means and to said valved passageway and having a valved passageway connected between a reference pressure and said time delay capacitor means and operable to hold the capacitor means in the reset discharged position.

11. The flow system of claim 10 wherein said controller requires a first minimum pressure level for operating the controller, said flow line requiring a second minimum pressure level substantially greater than the first level to establish proper line flow, said disable valve being set to respond to system pressure below said first minimum pressure to condition said controller for operation and above said first minimum pressure to disable said controller, said by-pass valve being set to by-pass system pressure from said disable valve and responsive to system pressure above said second minimum pressure level to connect system pressure to said disable valve.

* * * * *